US008620062B2

(12) United States Patent
Kwirandt

(10) Patent No.: US 8,620,062 B2
(45) Date of Patent: Dec. 31, 2013

(54) APPARATUS AND METHOD OF DETECTING A ROTATIONAL SETTING OF PLASTICS MATERIAL PRE-FORMS

(75) Inventor: Rainer Kwirandt, Barbing (DE)

(73) Assignee: Krones AG, Neutraubling (DE)

( * ) Notice: Subject to any disclaimer, the term of this patent is extended or adjusted under 35 U.S.C. 154(b) by 256 days.

(21) Appl. No.: 13/269,533

(22) Filed: Oct. 7, 2011

(65) Prior Publication Data

US 2012/0089252 A1    Apr. 12, 2012

(30) Foreign Application Priority Data

Oct. 7, 2010    (DE) .......................... 10 2010 047 621

(51) Int. Cl.
*G06K 9/00*    (2006.01)

(52) U.S. Cl.
USPC ........... 382/142; 382/141; 382/151; 382/100; 382/182; 382/149; 382/190; 382/199; 382/168

(58) Field of Classification Search
CPC ................. G01N 21/9054; G01N 2021/8887; G01N 2021/8455; G01N 21/95; G01N 21/9081; G01N 2291/2695; G06T 7/0004; G06T 7/004
USPC ......... 382/142, 141, 143, 151, 100, 182, 149, 382/190, 199, 168
See application file for complete search history.

(56) References Cited

U.S. PATENT DOCUMENTS

| 5,923,419 A * | 7/1999 | Thomas ..................... 356/239.4 |
| 2003/0020193 A1 | 1/2003 | Hamamoto et al. |
| 2008/0247858 A1 | 10/2008 | Lourman et al. |

FOREIGN PATENT DOCUMENTS

| DE | 20 2009 016 830 U1 | 6/2010 |
| EP | 0 101 246 A2 | 2/1984 |
| EP | 0 835 736 A2 | 4/1998 |
| EP | 1 279 477 A1 | 1/2003 |
| JP | 58-195108 A | 11/1983 |

OTHER PUBLICATIONS

European Search Report dated Dec. 27, 2011, issued in counterpart European Application No. 11182762.2.

* cited by examiner

*Primary Examiner* — Mike Rahmjoo
(74) *Attorney, Agent, or Firm* — Novak Druce Connolly Bove + Quigg LLP

(57) ABSTRACT

An apparatus for the detection of a geometrical position of plastics material containers, for example, plastics material pre-forms, having a base member and a thread region may include an image-recording device, which records a locally resolved image of the plastics material container. The image-recording device is arranged in such a way that it observes the plastics material container substantially along its longitudinal direction. The apparatus includes an illumination device, which illuminates at least one region of the plastics material container observed by the image-recording device, and an evaluation device, which on the basis of an image recorded by the image-recording device determines a rotary setting of the plastics material container with respect to its longitudinal direction.

14 Claims, 3 Drawing Sheets

APPARATUS AND METHOD OF DETECTING A ROTATIONAL SETTING OF PLASTICS MATERIAL PRE-FORMS

CROSS-REFERENCE TO RELATED APPLICATION

This application claims the benefit of priority of German Patent Application No. 10 2010 047 621.8, filed Oct. 7, 2010, pursuant to 35 U.S.C. 119(a)-(d), the disclosure of which is incorporated herein by reference.

TECHNICAL FIELD

The present disclosure relates to an apparatus and a method of detecting the position of containers and, in particular, of plastics material pre-forms.

BACKGROUND

It has long been known from the prior art to produce plastics material containers, and in particular plastic bottles, by plastics material pre-forms first being heated and by the heated plastics material pre-forms then being shaped by means of a shaping device, such as for example a stretch blow moulding machine, to form plastics material containers.

In this case, in addition to rotationally symmetrical containers, oval containers—for example oval PET bottles—are also known from the prior art. In order to produce containers of this type, it is known for the plastics material pre-forms to be heated in a non-uniform manner in the peripheral direction. In addition, however, those containers which are not only made oval but the closure of which must also be screwed onto the opening in the precise rotational setting are also known from the prior art.

This means that even before the shaping procedure the plastics material pre-form has to be orientated with respect to its rotational setting. The problem thus lies in the fact that the oval or asymmetrical containers are frequently not capable of being set and, depending upon the position of the bayonet or thread, they assume an immovable closure position. Only if the plastics material pre-forms are orientated with respect to the bayonet or thread, heated and blow moulded, are the closures then in the position in which they were desired by the customer.

Systems are known from the prior art which have to be constructed in a different manner for every new plastics material pre-form. In addition, the mechanical orientation of the plastics material pre-forms seriously limits the machine performance. It would be possible to use sensors for detection purposes, which are arranged for example in the individual treatment stations of a stretch blow moulding machine. In this case, however, a plurality of sensors would have to be used, namely one sensor for each blow moulding or conveying station, all of which would have to be adjusted and the position of which would also depend upon the plastics material pre-form to be treated in each case.

EP 1 279 477 A1 describes an apparatus and a method of blow moulding bottles. In this case a rotating device is provided which rotates the pre-form on the basis of the signals of a sensor unit in order to arrange it in a specified angular setting in a blow mould in this way.

EP 0 835 736 B1 describes an apparatus for blow moulding and an apparatus for injection stretch blow moulding. In this case rotation devices for rotating the pre-form about its longitudinal axis during the conveying of the pre-form are provided, as well as orientation devices in order to orientate in a pre-set direction the handle projecting from the pre-form.

It may be desirable to provide an apparatus which detects a geometrical position of the plastics material pre-form and, in particular, a rotational position of the plastics material pre-form with respect to its longitudinal axis.

SUMMARY

According to various aspects of the disclosure, an apparatus for the detection of a geometrical position of plastics material containers, and in particular of plastics material pre-forms, where the plastics material containers have a base member and a thread region, has an image-recording device which records a locally resolved image of the plastics material container or of a region of the plastics material container. In this case the image-recording device is arranged in such a way that it observes the plastics material container essentially along its longitudinal direction.

According to the disclosure the apparatus has an illumination device, which illuminates at least one region of the plastics material container observed by the image-recording device, and an evaluation device, which on the basis of an image recorded by the image-recording device determines a rotary setting of the plastics material container with respect to its longitudinal direction. It may be preferable for the evaluation device to determine the rotary position of the plastics material container on the basis of precisely one image recorded by the image-recording device. In addition, it would also be possible for the evaluation device to determine, on the basis of an image recorded by the image-recording device, information which is capable of being read out for example from a marking on the plastics material container. It is therefore proposed that the observation of the container should take place from below or from above the container and, in particular, substantially along its longitudinal direction. In this case it may be preferably possible for the image-recording device to be arranged below or above the container in the longitudinal direction. It would also be possible, however, for mirrors to be provided, and for the image-recording device to be arranged at a position other than below the container or above the container, so that an observation can nevertheless be made (with the beam path extending by way of passive reflector mirrors) in the longitudinal direction of the container.

One possible advantage of the proposed system is that as compared with systems which are known from the prior art it operates in a contact-free manner with light and an image-recording device, such as in particular a camera. As a result of the fact that the image-recording device may be advantageously situated below or above the plastics material pre-forms, it is possible for the inspection of the plastics material pre-form to do without elements which are situated in the region of a conveying path of the plastics material pre-forms. In this way, breakdowns of conveyors or transfer star wheels can be prevented.

Another possible advantage of observation from above or below results from the fact that the rotational position of the plastics material pre-form can be detected with only one image, and in this way no processing or multiple views are necessary. In the case of a horizontal inspection, for example in the conveying plane of the plastics material pre-form, it would become necessary for a multiplicity of recordings of the plastics material pre-form to be made. As a result of recording from above or below the rotational position of the plastics material pre-form can also be determined at points at which the plastics material pre-forms are held in a rigid manner.

In the case of another exemplary embodiment the inspection of the plastics material pre-form is carried out in a transfer star wheel and the result of the aforesaid inspection is forwarded to a following machine such as for example to a treatment star wheel, and in particular to the servo motors of this treatment star wheel. These servo motors can then rotate the plastics material pre-forms into a desired rotational position.

It may be advantageous for the illumination device to be arranged or designed in a substantially annular manner with respect to the longitudinal direction of the plastics material container. In this way it would be possible, for example, for a plurality of light sources such as LEDs for example to be arranged in an annular manner around the longitudinal axis of the plastics material pre-form. In addition, however, it would also be possible for light rings and the like to be used. It may be advantageous for the container to be illuminated from at least two directions, in some aspects at least three, and in some aspects from a multiplicity of different directions, so that in this way a fully comprehensive illumination of the container and, in particular, the support ring thereof is made possible in a particular advantageous manner.

This procedure is suitable for many types of plastics material pre-forms, and adaptation can be carried out by modification of the software/evaluation parameters, so that, in a potentially advantageous manner, no mechanical alteration is necessary during the conversion to different plastics material pre-forms.

In the case of an exemplary embodiment the illumination device is arranged between the image-recording device and the plastics material container. In this way it is possible to prevent light from passing directly from the illumination device into the image-recording device.

In the case of an exemplary embodiment the image-recording device is arranged below the plastics material container or the image-recording device observes the plastics material container from below. Simple markings on the underside or at the edge of the plastics material pre-forms, for example their support rings, are sufficient in this case to ensure the image recording. In this way, enough area remains on an upper side of the support ring to be able to carry out a sealing on the support ring for example for the subsequent blow moulding procedure. It would also be possible, however, for the rotational setting of the plastics material pre-forms to be detected with reference to features of the thread and to carry out an observation from above in this case. With this procedure it is also possible for mechanical cams between the support rings and the thread to be omitted.

An observation in the longitudinal direction of the plastics material pre-forms is understood as being that a direction of observation with respect to the longitudinal direction of the containers differs from the amount by not more than 20°, in some aspects by not more than 10°, and in some aspects by not more than 5°.

It may be advantageous for pericentric images or observations, and in some aspects, also pericentric illumination to be used, i.e. the plastics material pre-forms are illuminated and also observed along their entire periphery. It may also be advantageous for the illumination device to be arranged below the plastics material container or below the conveying path thereof. In this way, it may be advantageous for both the illumination device and the image-recording device to be arranged below the plastics material pre-forms or the conveying path thereof. The illumination devices and the observation devices can thus be designed in the form of a modular unit.

As mentioned above, the illumination device may be advantageously designed in such a way that light emerging from the illumination device does not strike the image-recording device directly. In this way, it would be possible for example for screens to be provided which prevent a direct beam path between the illumination device and the image-recording device.

In the case of an exemplary embodiment a lens body is arranged between the illumination device and the plastics material containers. It may be advantageous for this to be a lens with a small aperture ratio (focal length/diameter) which is between 2.0 and 0.5, in some aspects between 1.5 and 0.7. In some aspects, a lens is used which has a texture on at least one of its surfaces and it is in some aspects for the lens used to be a Fresnel lens.

In addition, the illumination device may advantageously have a plurality of single-colour LEDs. In this case it would additionally be possible for a ring mounted on the Fresnel lens to separate the vision area and the illumination area of the Fresnel lens from each other, so as to prevent interfering reflexes in the camera image. The single-colour LEDs allow the lens also to be used at the same time for the imaging system. When light is used with sharply differing wavelengths (white light, RGB LEDs etc.) the image becomes very blurred on account of the colour aberrations of the cheap lens.

The selection of a Fresnel lens also has advantages in particular with respect to the costs. Instead of a Fresnel lens it would also be possible for pericentric objective lenses to be used, which possibly improve the imaging, but which are nevertheless very expensive. Normal pericentric objective lenses are so expensive because they have large lens systems which have been corrected for trouble-free imaging. They are not therefore usually used for the illumination.

It may be advantageous for a distance to be present between the said lens and the support ring of a plastics material pre-form to be observed of between 150 and 300 mm, in some aspects between 170 and 250 mm, and in some aspects between 190 and 210 mm. In addition, it may be advantageous for a lens body to be used which has a focal length which substantially corresponds to the distance of the lens from the support ring of the plastics material pre-form, or in some aspects in a range of plus or minus 20% of this distance. In the case of this procedure the light is optimally concentrated on the support ring of the plastics material pre-forms.

Since the lower pre-form frequently covers the support ring, in the extension of the longitudinal axis of the plastics material pre-form, during a normal observation of the support ring of the plastics material pre-form from below, the support ring can be better observed by the use of a pericentric imaging. In addition, the problem frequently arises in practice that the centripetal force bends the soft and heated plastics material pre-forms during the conveying on curved paths. In this case they frequently also cover the support ring on one side. In the case of the pericentric imaging the support ring is viewed comprehensively from obliquely on the outside.

In this way it is possible for the lower end of the plastics material pre-form to be able to have approximately the diameter of the support ring and, in addition, also to be able to bend laterally. In addition, a certain positional tolerance is also made possible with respect to the gripping device or holding apparatus which holds the plastics material pre-form during its conveying.

It is also possible for a lens body to be arranged between the observation device and the plastics material container. It may be advantageous for this to be the same lens body which is also arranged between the illumination device and the plastics material container.

In the case of an exemplary embodiment the illumination device illuminates a support ring of the plastics material container, and the image-recording device records an image of the illuminated support ring. In this way, a conclusion can be drawn very easily on a rotational position of the plastics material container with respect to its longitudinal axis, in particular by markings on the support ring.

In addition, it is also possible for the degree of pericentricity to be set by a variation of the distance of the image-recording device from the Fresnel lens. The greater the distance of the image-recording device from the lens, the greater the resulting angle of observation if the remaining parameters are retained. It would optionally also be possible for specific considerations to replace the lens with a different lens with a correspondingly larger or smaller focal length.

It may be preferable for the Fresnel lens and the illumination (they are part of the housing!) to be only basically set, and further settings are made with the camera removal since in this way it is necessary to move only the small camera and not the entire structure.

If the camera objective lens is in the focal length of the Fresnel lens, a telecentric imaging, or a completely straight vision, is obtained in this way. As the distance increases, the view of the support ring of the plastics material pre-form becomes increasingly oblique. In this case the image of the support ring occupies an increasingly large area of the Fresnel lens. In this way, the system can be set in an optimum manner to different support ring and opening sizes. It may therefore be preferable for a position of the image-recording device to be adjustable with respect to the lens body. It may also be preferable for a distance between the lens body and the plastics material pre-form observed to be adjustable.

It may be preferable for a distance between the lens body and the image-recording device to be greater than the focal length of the lens body, and it may in some aspects be preferred for the distance to be between 1.5 times the focal length and 3 times the focal length and in some aspects between 1.8 times the focal length and 2.4 times the focal length. It may thus be advantageous for the image-recording device to be adjustable in the direction of the longitudinal direction of the plastics material pre-form.

It may be advantageous for a structural height, calculated from the lens body to the end of the image-recording device, to be in a range of from 400 to 800 mm. In order to reduce the vertical extension, it is also possible for a passive reflector mirror to be inserted between the Fresnel lens and the camera, so that, although the direction of observation of the camera itself is situated at a right angle to the longitudinal direction of the plastics material pre-form, at the same time [it] records an image in the longitudinal direction of the plastics material pre-form by way of the aforesaid passive reflector mirror. In this way, the system can be adapted in a more compact and an improved manner to the space ratios in the respective machines. The aforesaid beam reflection, however, is not necessary for the operation of the apparatus.

The present disclosure additionally relates to a plant for the treatment of plastics material pre-forms with an apparatus of the type described above as well as a rotation device which rotates the plastics material pre-form about or with respect to the longitudinal direction of the plastics material container whilst taking into consideration a rotational position thereof determined by the evaluation device. It may be advantageous for the aforesaid rotation device to be arranged downstream of the apparatus according to the disclosure in a conveying direction of the plastics material pre-forms. The rotation device rotates the plastics material pre-form about its longitudinal axis in reaction to a rotational setting of this plastics material pre-form determined by the apparatus according to the disclosure.

In the case of an exemplary embodiment the plant has a conveying device which moves the plastics material pre-form along a conveying path with respect to the apparatus. This conveying device can be for example a transfer wheel on which are arranged a plurality of gripping elements which hold the plastics material pre-forms in each case. It may be advantageous for the conveying of the plastics material pre-forms with respect to the apparatus according to the disclosure to take place in a continuous manner. In an exemplary embodiment a blow moulding machine, in particular a stretch blow moulding machine, which shapes the plastics material pre-forms to form plastics material containers is arranged downstream of the apparatus according to the disclosure.

In the case of an exemplary embodiment the apparatus also has a position detection device which detects a position of the plastics material pre-form, in particular during the conveying thereof and along the conveying path. This can be for example a light barrier device which determines the position of the plastics material pre-forms in each case and triggers a light pulse of the illumination device in a manner dependent upon the position of the plastics material pre-form in reaction to the respective location of the plastics material pre-forms. In this case it may be advantageous for this light barrier device to be arranged just upstream of the apparatus according to the disclosure along the conveying path of the containers, so that sufficient time remains for triggering the light pulse in reaction to the position of the plastics material pre-form detected on the one hand and the position can be established with sufficient accuracy on the other hand.

The present disclosure additionally relates to a method of detecting a geometrical position of plastics material containers and, in particular, a rotational setting of plastics material pre-forms with respect to their longitudinal axis, in which case an illumination device illuminates the plastics material pre-form, and an observation device observes the plastics material pre-form—illuminated by the illumination device—substantially along its longitudinal direction and records an image of the plastics material pre-form.

According to the disclosure a rotational setting of the plastics material pre-form with respect to its longitudinal direction is determined from at least one recorded image.

In the case of an exemplary method the plastics material pre-form is rotated about the longitudinal axis thereof in reaction to the recorded image.

It may be advantageous for the plastics material pre-form to be observed from a multiplicity of directions. In the case of an exemplary method a support ring of the plastics material pre-form is illuminated, and it may be advantageous for this illuminated area also to be observed by the image-recording device.

It may be advantageous for the plastics material pre-form to be illuminated pericentrically, as mentioned above, in which case the light may be concentrated in a particularly advantageous manner upon the support ring or the opening and, as a result, a bright image is produced.

It may be preferable for the rotational setting of the plastics material pre-form to be determined from precisely one recorded image, it being in some aspects preferred for a processing movement also to be omitted for the inspection.

Further advantages and embodiments are evident from the accompanying drawings.

DETAILED DESCRIPTION

Figure 1:
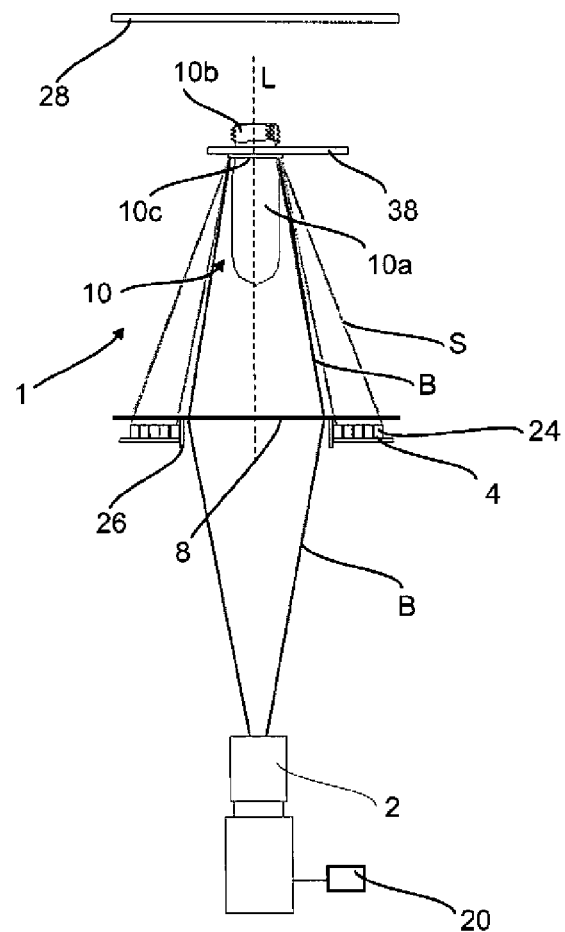
FIG. 1 is a diagrammatic illustration of an exemplary apparatus according to various aspects of the disclosure.

FIG. 1 is a diagrammatic illustration of an apparatus 1 for inspecting plastics material pre-forms 10. In this case the plastics material pre-form 10 has an opening area 10b and a base member 10a. The reference L relates to a longitudinal direction of the plastics material pre-form 10.

It is evident that the plastics material pre-form 10 is observed here by an image-recording device 2, such as a camera, along its longitudinal direction L. In the case of this arrangement the plastics material pre-form is observed from below. The reference number 4 relates to an illumination device which in this case likewise illuminates the plastics material pre-form from below and with the beam path S. This illumination device has a plurality of light-emitting diodes 24 here which may advantageously direct single-coloured light onto the plastics material pre-form. As is evident in FIG. 1, the light forms a cone here around the sight cone B of the camera. The light thus strikes the plastics material pre-form 10 or the support ring 10c thereof at a similar angle as compared with the angle of observation. This is beneficial for the reflection on horizontal surfaces, such as for example the underside of the support ring. The direction at which the plastics material pre-form is illuminated and the direction at which it is observed may therefore be advantageous, and that means in a similar manner that they differ from each other by less than 50°, in some aspects by less than 40°, and in some aspects by less than 30°, and in some aspects by less than 20°.

Since most light passes through the support ring 10c in the case of transparent material, such as the material of the plastics material pre-forms, it is possible for the light passing through to illuminate the holding apparatus 38 such as a clamp in the case of suspended conveying of the pre-forms or in some aspects a closed ring in the case of standing conveying of the pre-forms and the background 28 and thus to cause defects in the image. Fully comprehensive, annular holding apparatus may be preferred since they form a uniform background for the support ring.

The holding apparatus 38 and the background face 28 can therefore have a rough, light-absorbing and abrasion-resistant surface. As a result, the main component of the light passing through is weakened to the extent that the small light component reflected on the support ring defines the image.

The reference number 8 relates to a lens body which in this case is arranged between the image-recording device 2 and the plastics material pre-form 10 and also between the illumination device 4 and the plastics material pre-form 10. In the case of the embodiment shown in FIG. 1 the outer area of the plastics material pre-form is illuminated with the same lens body 8 which is also used for the pericentric imaging by the image-recording device 2. In this way, a simple, flat circular lamp, in particular equipped with LEDs, can be used for illumination. The lens body 8 or the Fresnel lens deflects the individual light cones of the LEDS in such a way that the desired large light cone S is formed. This procedure is simpler and more inexpensive to carry out than for example a perforated body in which each LED has its own orientation.

In this way, the illumination is effected by the hollow illumination cone S. The reference number 28 in FIG. 1 relates to a background which in this case may be advantageously rough, dark or black, but in particular is made absorbent for the light emerging from the illumination device.

The reference number 26 designates a screening device which prevents light from passing from the illumination device 4 to reach the image-recording device 2 directly or by way of reflection in the central lens area. In addition, it would also be possible for the individual light sources to abut directly against the lens body 8.

The reference number 20 designates an evaluation device which evaluates the images (cf. FIG. 4) recorded by the image-recording device. In this case, for example, a rotational setting or orientation of the plastics material device is detected for example by the position of a marking (shown in FIG. 4) being determined. In addition, however, the evaluation device could also be used in order for example to read out symbols provided on the support ring and to identify the plastics material pre-form in this way.

Figure 2:
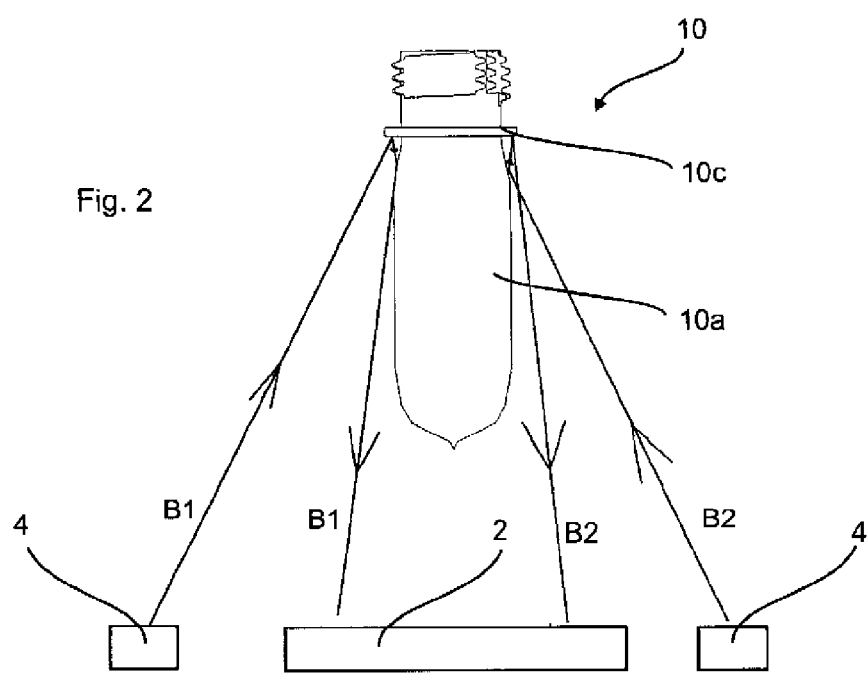
FIG. 2 is an illustration of the exemplary observation of plastics material pre-forms according to various aspects of the disclosure.

FIG. 2 shows two possible beam paths in the observation of the plastics material pre-form 10 or the support ring 10c thereof. In each case the underside of the support ring is observed, and since the observation is carried out obliquely the respective reflex is visible only by a double reflection.

In the case of the first observation path B1 the light of the illumination device strikes the support ring 10c and is reflected on this ring to the base member 10a of the plastics material pre form 10. A second reflection to the image-recording device 2 takes place on the base member 10a of the plastics material pre-form 10. The image-recording device or camera sees the mirror image of the support ring on the base member 10a of the plastics material pre-form. This inner mirror image, however, can easily be covered in part by the base member 10a of the plastics material pre-form 10.

In addition, a second observation path is also possible. In this case the light of the illumination device 4 first strikes the base member 10a of the plastics material pre-form 10 and is reflected from there onto the support ring 10c. The support ring 10c then reflects the light to the camera where it (the support ring) appears to be brightly illuminated. This outer image area is less at risk of being covered, as is evident from FIG. 2, and is evaluated.

It has been found that the illumination operates in a satisfactory manner in this way. In the case of this embodiment, therefore, a true conical or coaxial illumination is omitted. This could likewise, however, be used. In the case of an arrangement of this type it would be possible for a semi-transparent mirror to mirror in the light of the LEDs upstream of the image-recording device. In this case a light-scattering matt screen may be preferably provided upstream of the illumination devices, so that bright punctiform reflexes do not occur on the following lens and the window (not shown here).

In addition, it would be possible to use the lens body 8 itself as a window. The matt screen through which light passes also produces reflexes on the surfaces and surface defects from the lens and the window, which are evident in the camera image. In this case, therefore, it may be preferably possible to dispense with the inexpensive Fresnel lens. The lens and the window may preferably have an anti-reflex coating on all surfaces.

In this case the lens again refracts the optical and light beams onto the support ring in a conical manner. This method, however, is more complicated than the method described with reference to FIGS. 1 and 2.

As mentioned, it would also be possible for the illumination device 4 and the observation device 2 to be arranged above the plastics material pre-form in order to determine a beginning of a thread (which is frequently flat and brightly reflecting), vent slots, bayonet thread parts and the like in this way.

Furthermore, it would also be possible for a detection system to be provided both above and below the plastics material pre-form. This detection system could be considered in the case of special plastics material pre-forms or even in the case of types of plastics material pre-forms which have different markings in order to permit in this way a change of types without alteration.

In addition, plastics material pre-forms of material with diffusely scattered particles can also be inspected with the apparatus according to the disclosure. In the case of bright and/or diffuse plastics material pre-forms the influence of the background is substantially less than in the case of transparent plastics material pre-forms. Since the diffuse back scattering in this case is substantially brighter than the reflex image, continuous notches on the edge of the support ring are thus particularly easy to detect. In the case of dark, diffuse material the light is strongly absorbed, and in this case it is necessary to work with the reflected light of the surface as in the case of the transparent plastics material pre-forms.

Figure 3:
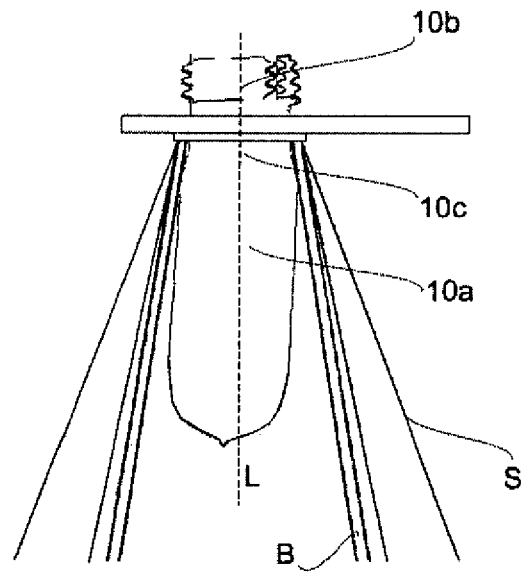
FIG. 3 shows a further possibility of observing plastics material pre-forms according to various aspects of the disclosure.

FIG. 3 is a further illustration to explain the measurement principle. In this case this is a plastics material pre-form which is bent in the course of the heating and for example a movement on a circular path, or the base body 10*a* is obliquely inclined with respect to the thread area 10*b*. Here too a pericentric view of the camera device 2 goes past the oblique base body 10*a*. The observation in this case is made along the longitudinal direction of the non-curved plastics material container. It would also be possible, however, for the direction of viewing to be deliberately adapted to a curvature of the plastics material pre-form which is to be expected, i.e. to observe the containers in particular at a pre-set oblique angle.

Figure 4:
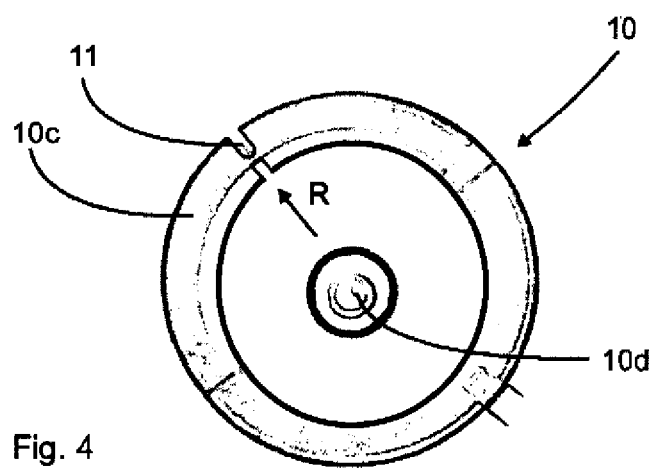
FIG. 4 shows an exemplary recorded image of a plastics material pre-form according to various aspects of the disclosure.

FIG. 4 is an illustration of an image recorded with the apparatus according to the disclosure. A marking 11, which is provided on the support ring 10*c* of the container and which extends in the radial direction R in this case, is clearly evident in this image.

The reference 10*d* designates an injection point of the plastics material pre-form 10. In this way, with reference to this image, the rotational setting or orientation of the plastics material pre-form can be determined with respect to its longitudinal axis and the plastics material pre-form can then be rotated.

Figure 5:
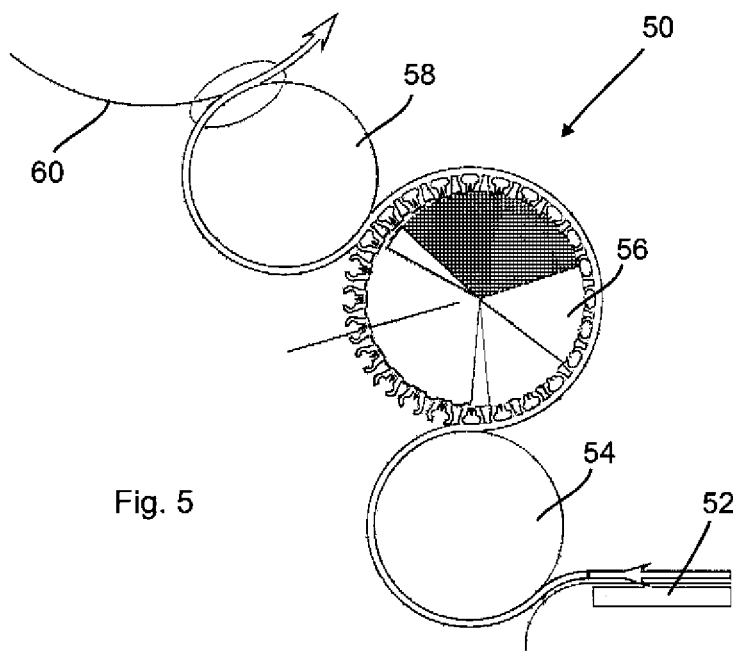
FIG. 5 is a diagrammatic illustration of an exemplary plant for the treatment of plastics material pre-forms according to various aspects of the disclosure.

FIG. 5 is a diagrammatic illustration of a plant according to the disclosure for the treatment of containers. In this case the plastics material pre-forms (not shown) move out of a heating device 52, which heats them. The plastics material pre-forms are transferred by way of a transfer wheel 54 to a treatment module or a contacting device 56 with which the plastics material pre-forms are contacted on specified areas of their periphery and are cooled here. After that, the plastics material pre-forms partially cooled in this way are transferred by way of a further transfer wheel 58 to a stretch blow moulding machine 60 and there they can be shaped in particular into non-circular or oval containers. The rotational setting or orientation of the plastics material pre-forms with respect to the longitudinal direction thereof is detected along the transfer wheel 54 and after that the plastics material pre-forms are rotated about a pre-set angle with respect to their longitudinal axis.

Figure 6:
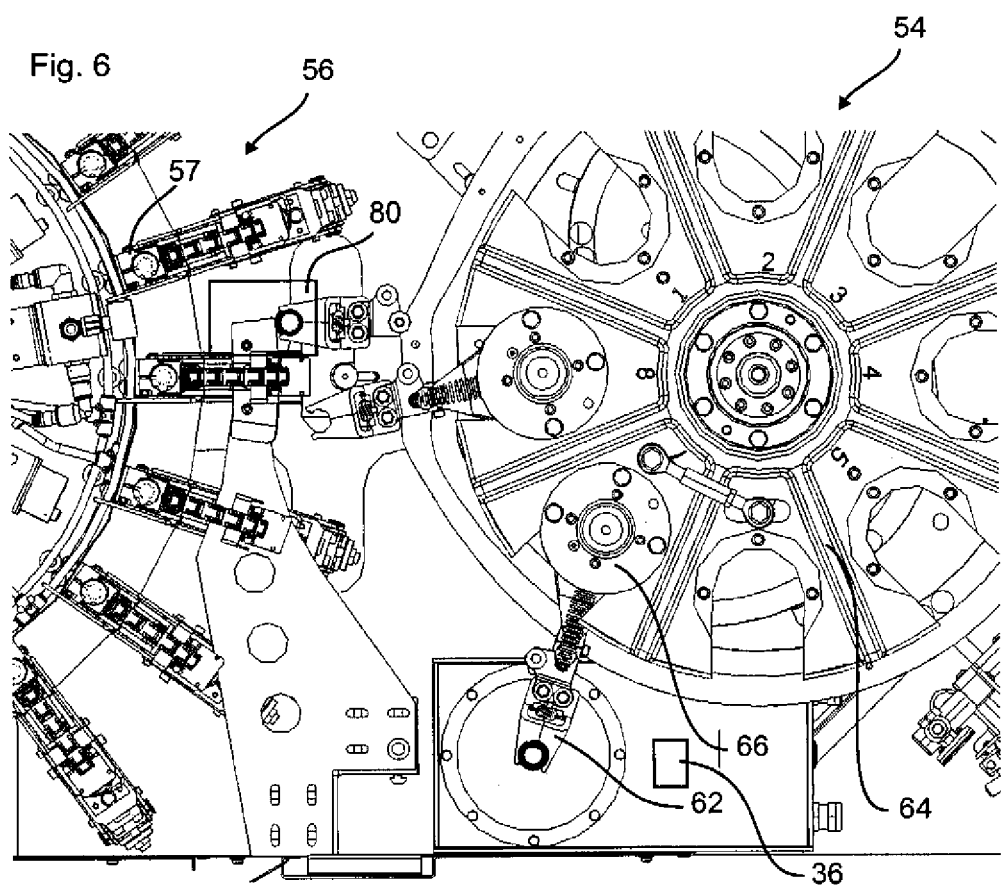
FIG. 6 is a detailed view of an exemplary plant for the treatment of plastics material pre-forms according to various aspects of the disclosure.

FIG. 6 is a detailed illustration of the area between the transfer wheel 54 and the contacting device 56. It is evident that the transfer wheel 54 has in this case a plurality of gripping elements 62 such as gripping clamps which grip and convey the plastics material pre-form above its support ring. In this case the gripping devices are mounted on a main support 64 with individual supports 66, as a result of which the transfer to the contacting device 56 is made easier. The contacting device 56 has in each case contacting elements 57 which contact the plastics material pre-forms in part on their outer wall. In this case the contacting elements 57 can also be arranged on a support 66. The transfer wheel 54 can also be designed in the form of a distribution delay star wheel.

In the case of some applications it is also possible for the holding clips 62 to be made blackened. These holding clips 62 are visible both around and (in the case of transparent plastics material pre-forms) through the support ring in the image. In this case, however, the gripping clips 62 do not abut around the plastics material pre-form over its entire periphery and have edges, gaps and textures. In order to keep the effect of these edges, gaps and textures upon the evaluation as small as possible, the holding clips 62 may be advantageously provided with a matt, rough and abrasion-resistant black surface.

Between the inspection of the plastics material pre-forms 10 and the detection of the rotational setting or orientation of the plastics material pre-forms with respect to the longitudinal direction L on the one hand and the supply to the contacting device 56 on the other hand, the plastics material pre-forms are rotated with respect to their longitudinal direction. For this purpose a rotating device 80 (which is shown only in outline and which has stepping motors for example) is provided which rotates the plastics material pre-forms with respect to their longitudinal direction in a manner dependent upon the determined rotary setting or orientation of these plastics material pre-forms. The direction of rotation can be designed in this case in the form of a separate module, but it could also be arranged on the transfer wheel 54.

In this case the pre-forms may be rotated individually in such a way that after running through the rotating device 80 they are orientated with the same rotary setting in each case. The rotating device 80 can have a mandrel or a gripping device which may penetrate into the opening of the plastics material pre-forms and rotates them in this way. In this case the aforesaid mandrel can also move jointly along the conveying path of the plastics material pre-forms and, in particular, can also perform the rotation of the plastics material pre-forms during this movement. The reference number 36 relates to a position detection device (indicated only diagrammatically), such as for example a light barrier, which detects a position of the plastics material pre-forms along their conveying path and may be used for initiating a recording of the plastics material pre-form.

In addition, a likewise matt black and/or bright disc 28 shown in FIG. 1 is provided as a background on the opposite side. In this way, defects in the image, such as the view of movable machine parts or extraneous light through windows or overhead lights in the machine shop, are prevented. As a whole, the evaluation is simplified by a uniform background. In addition, it is also possible, in particular in the case of plastics material pre-forms of transparent material, to improve the inspection by special markings and a matted or unpolished underside of the support ring.

It will be apparent to those skilled in the art that various modifications and variations can be made to the apparatus and method of detecting a rotational setting of plastics material pre-forms of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for the detection of a geometrical position of plastics material containers, wherein the plastics material containers have a base member and a thread region, the apparatus comprising:
    an image-recording device, which records a locally resolved image of the plastics material container, the image-recording device being arranged in such a way that it observes the plastics material container substantially along its longitudinal direction;
    an illumination device, which illuminates at least one region of the plastics material container observed by the image-recording device;
    an evaluation device, which on the basis of at least one image recorded by the image-recording device determines a rotary setting of the plastics material container with respect to its longitudinal direction; and
    a position detection device, which detects a geometrical position of the plastics material pre-form.

2. An apparatus according to claim 1, wherein the illumination device is arranged in a substantially annular manner with respect to the longitudinal direction of the plastics material container.

3. An apparatus according to claim 1, wherein the illumination device is arranged between the image-recording device and the plastics material container.

4. An apparatus according to claim 1, wherein the image-recording device is arranged below the plastics material container.

5. An apparatus according to claim 1, wherein the illumination device is arranged below the plastics material container.

6. An apparatus according to claim 1, wherein the illumination device is arranged in such a way that light emerging from the illumination device does not strike the image-recording device directly.

7. An apparatus according to claim 1, further comprising a lens body arranged between the illumination device and the plastics material container.

8. An apparatus according to claim 1, further comprising a lens body arranged between the observation device and the plastics material container.

9. An apparatus according to claim 1, wherein the illumination device illuminates a support ring of the plastics material container, and the image-recording device records an image of the illuminated support ring.

10. An apparatus according to claim 1, wherein the plastics material containers comprise plastics material pre-forms.

11. A plant for the treatment of plastics material pre-forms comprising:
    an apparatus according to claim 1; and
    a rotation device which rotates the plastics material pre-form with respect to the longitudinal direction of the plastics material pre-form whilst taking into consideration a rotational setting thereof determined by the evaluation device.

12. A plant according to claim 11, further comprising a conveying device which moves the plastics material pre-form along a pre-set conveying path with respect to the apparatus.

13. A plant according to claim 11, further comprising a position detection device which detects a position of the plastics material pre-form along the conveying path.

14. A method of detecting a geometrical position of plastics material containers, comprising:
    illuminating a plastics material container with an illumination device;
    observing, via an image-recording device, the plastics material container illuminated by the illumination device along its longitudinal direction;
    recording, via the image-recording device, at least one image of the plastics material pre-form;
    determining, via an evaluation device, a rotational setting of the plastics material pre-form with respect to its longitudinal direction from the at least one recorded image; and
    detecting, via a position detection device, a geometrical position of the plastics material pre-form.

* * * * *